Dec. 9, 1924.  
R. S. HISLOP  
ROLLS FOR CANDY MAKING MACHINES  
Filed Nov. 23, 1922    2 Sheets-Sheet 1

1,518,260

Inventor:
Robert S. Hislop.
By Macleod, Calvert, Copeland & Dike,
Attorneys.

Dec. 9, 1924.

R. S. HISLOP 1,518,260

ROLLS FOR CANDY MAKING MACHINES

Filed Nov. 23, 1922  2 Sheets-Sheet 2

Inventor:
Robert S. Hislop
By Mason, Calvert, Copeland & Pike
Attorneys.

Patented Dec. 9, 1924.

1,518,260

UNITED STATES PATENT OFFICE.

ROBERT S. HISLOP, OF RACINE, WISCONSIN, ASSIGNOR TO RACINE CONFECTIONERS MACHINERY COMPANY, OF RACINE, WISCONSIN, A CORPORATION OF WISCONSIN.

ROLLS FOR CANDY-MAKING MACHINES.

Application filed November 23, 1922. Serial No. 602,765.

*To all whom it may concern:*

Be it known that I, ROBERT S. HISLOP, a citizen of the United States, residing at Racine, county of Racine, State of Wisconsin, have invented a certain new and useful Improvement in Rolls for Candy-Making Machines, of which the following is a specification, reference being had therein to the accompanying drawings.

This invention relates to candy-making machines of the type wherein the plastic candy material is passed between rolls which are suitably formed on their peripheries to cut off and shape the material during its passage therebetween into candies of the desired size and form. The shaping and cutting rolls of machines of this type are quite expensive, inasmuch as they are usually of solid construction with peripheral surfaces engraved to impress the candy into the different shapes, each of said rolls having to be specially engraved in accordance with the particular work which they are intended to do.

The present invention has for its object to provide a built-up roll for machines of this character, said roll being composed of standardized parts of different forms which may be assembled in a wide variety of combinations in accordance with the requirements in order to produce rolls which will shape the candies into the desired forms, each roll being preferably so arranged as to produce an assortment of different kinds of candy, as, for example the varieties of relatively hard candies known in the trade as "waffles," "kisses," "pillows," "chips," "straws," "buttercups," etc.

The foregoing and other objects of the invention, together with means whereby the same may be carried into effect, will best be understood from the following description of one form or embodiment thereof illustrated in the accompanying drawings, in which.

Figure 1:
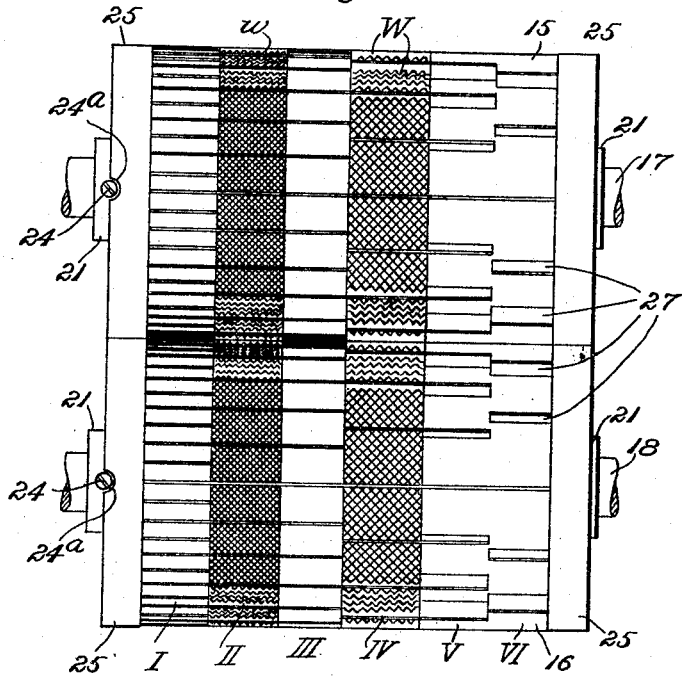
Fig. 1 is a front elevation of a pair of rolls constructed in accordance with the invention.

Referring to Figure 1, the rolls 15 and 16 shown therein are carried by shafts 17 and 18, respectively, and are driven in unison and in opposite directions through said shafts by the mechanism of the machine. Machines of this general type being well known in the art, the other parts of the mechanism are not shown or described herein as they form no portion of the present invention. The machine in which the present rolls are used may, for example, be similar to that shown and described in the patent to Frank H. Woolf, No. 971,097, September 27, 1910, as modified in accordance with another application filed by me November 23, 1922, Serial No. 602,764, to provide a continuous instead of an intermittent rotation of the rolls.

The two rolls 15 and 16 are complementary to one another, as will be understood, so that a description of one will suffice for both.

Figure 3:
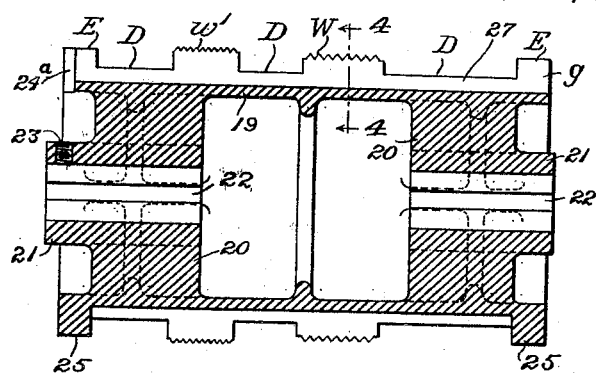
Fig. 3 is a longitudinal section, taken substantially on the line 3—3 of Fig. 2, with the knives in place.
Figure 2:
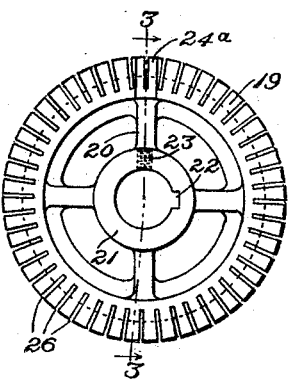
Fig. 2 is an end elevation of one of the rolls, the knives being omitted.

As shown in Figures 2 and 3, each roll is preferably of skeleton form and comprises a peripheral portion 19 which is connected by webs 20 with end hub portions 21 having keyways 22 whereby they may be splined to the corresponding shaft, one of said hub portions having a threaded opening 23 to receive a set screw 24 (Fig. 1) for fixing the longitudinal position of the roll on the shaft, and the peripheral portion 19 being notched, as shown at 24ª, to afford ready access to said set screw. The peripheral portion 19 of the roll comprises end flanges 25 and a portion intermediate said flanges of less diameter than the latter. The flanges 25 of the two rolls engage one another during the operation of the machine, the candy being shaped and cut by the portions of said rolls between said flanges. The peripheral portion 19 of the roll is provided with a series of longitudinal slots 26, said slots extending through the flanges 25 and being of a sufficient depth to extend also across the portion intermediate said flanges. Each of said slots is adapted to receive a substantially straight knife or cutting blade 27, said knives being formed separate from the body of the roll and being inserted into the slots 26 thereof in such manner as to provide the desired form of cutting surface. The knives fit the grooves with sufficient tightness to be held in fixed positions after their insertion into said grooves, being, if desired, slightly upset by the application of a punch at suitable points. The several knives 27 may be of a variety of forms, so that by choosing and combining the proper knives a very great variety of shapes may be produced.

Figure 5:
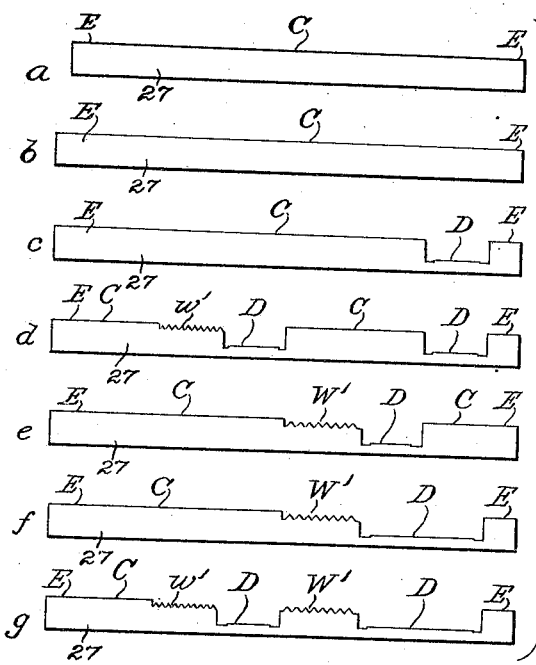
Fig. 5 is a collective detail view showing some of the forms which may be assumed by the knives.
Figure 8:
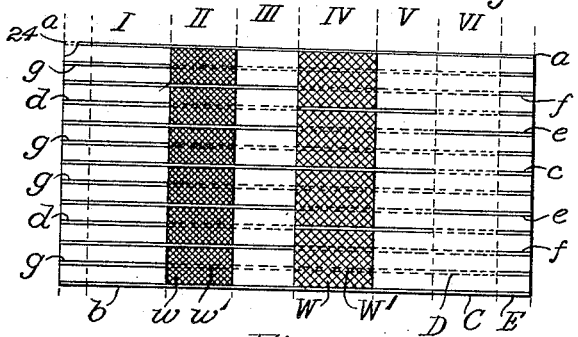
Fig. 8 is a development of one quarter of the periphery of one of the rolls shown in Fig. 1.

In the illustrative arrangement shown in Figs. 1, 5 and 8 of the drawings, the rolls are so constructed and the knives so selected and arranged as to provide a longitudinal series of six peripheral sections I, II, IV, V, and VI (Figs. 1 and 8), so that by feeding six strips of plastic candy material through the machine and between the rolls 15 and 16, six different shapes of candy may be produced at once, or any one or more of the six may be made by feeding one or more strips at different points. As shown, the peripheral portions of the rolls corresponding to the sections II and IV are engraved so as to form checkered surfaces W and w, adapted to impress upon the candy strips a suitable design to form what are known in the trade as "waffles." The particular set of knives shown in detail in Figure 5, and diagrammatically, in assembled relationship, in Figure 8, is so designed as to provide different lengths of cut in the sections II and IV and also to provide different lengths of cut in the remaining sections.

Figure 4:
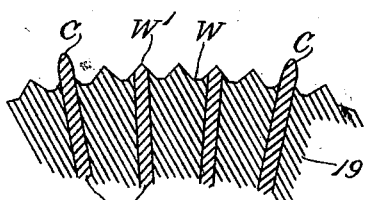
Fig. 4 is a greatly enlarged detail section, taken substantially on the line 4—4 of Fig. 3, of a portion of the periphery of the rolls.
Figure 6:
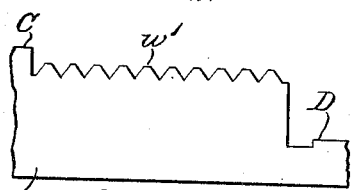
Figs. 6 and 7 are enlarged detail views of portions of some of the knives shown in Fig. 5.
Figure 7:
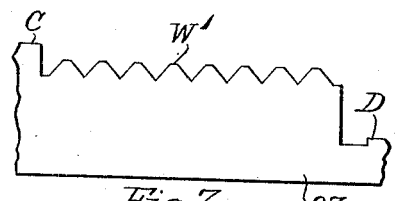

Seven forms of knives are shown in Figure 5, these seven forms, by different combinations and arrangements, providing the different cuts desired in the different sections. Each knife has an end portion E arranged to occupy the portions of the slots 26 in the flanges 25 and to lie flush with the latter so as to complete the same. Each knife has also one or more cutting portions C where said knife is of the same width as at the portions E, so that said cutting portions will also be substantially flush with the flanges 25. Most of the knives have also one or more depressed or blank portions D adapted, when the knife is in position, to lie flush with the peripheral surface of that part of the roll between the flanges 25. In addition, certain of said knives have portions W′ or w′ (see particularly Figs. 4, 6, and 7), or both, shaped to correspond to and complete the engraved surfaces W and w where the slots 26 cross the same. Each knife has a portion corresponding to the six longitudinal sections of the roll, each portion being so shaped as to enable the knife to perform its intended function in that section. Thus, in the case of the knife b, the cutting edge C extends across all of the sections, so that all of the candy strips will be cut by this knife. The knife a is similar to the knife b but is slightly shorter, so as to occupy a position opposite the notch 24ª without obstructing the latter. The knife c has a cutting portion C extending through all of the sections with the exception of section VI, where said knife is provided with a depressed portion D. The knife d has cutting edges C in sections I, IV and V, a portion w′ opposite the "waffle" section w, and depressed portions D opposite the sections III and VI. The forms of the other knives will be obvious without further description. It will be noted that the knives a, b, c, e, and f are so formed as to cut off the candy in the "waffle" section II, while the knives d and g are arranged as at w′, to complete the surfaces in this section. Similarly the knives a, b, c, and d are arranged to cut off the candy in the "waffle" section IV, whereas the knives e, f and g are designed, as at W, to complete the surfaces in this section. In the illustrative arrangement of knives shown in the development, Figure 8, it will be noted that all of the knives cut candy in section I, thereby cutting up the strips into short lengths, that in section III every second knife will cut the candy, in section V every third knife, and in section VI every fourth, thus providing for successively greater lengths of plain candies, such as "buttercups," "pillows," "straws," etc. It will also be noted that the "waffles" formed by section II are cut by every second knife, while those in section IV are cut by every third knife, thus providing for "waffles" in different sizes. By the use of a greater or less number of certain of the knives, and a different arrangement thereof, different lengths of cuts in the different sections, or the same length of cut in several or all sections, may be provided for.

In Figure 8, the knives are shown throughout, the portions thereof C and E which are flush with the flanges 25 being shown in full lines, and the portions D, W′, and w′ which are flush with the other portions of the surface of the roll being shown in dotted lines. In Figure 1 the cutting portions C only of the knives are shown, those portions which merely complete the flanges 25 or the other surfaces between said flanges being omitted in order to make clear the effective form of the rolls and the staggered relationship of the cutting portions of the knives.

It will be obvious that, by providing a suitable assortment of standardized parts which can be manufactured in quantities and kept in stock, and including plain and engraved rolls and sets of knives similar to that shown in Fig. 5, or otherwise, rolls suitable for a wide variety of work may be built up or assembled quickly and at a cost considerably less than that of specially engraving each set of rolls in accordance with the particular requirements, as has heretofore been the practice. By plain rolls is meant rolls without the "waffle" sections w and W or other engraved portions. The knives used with such rolls would be without the portions w' and W' but would have in lieu thereof depressed portions D to complete plain, instead of engraved, surfaces of the rolls.

The set of knives shown in Fig. 5 is, of course, illustrative merely, and in Fig. 3 are shown two knives which are slightly different from any of those shown in the former figure. Each of these knives comprises depressed portions D in sections I, III, and VI and portions w' and W' respectively in sections II and IV. These knives have no cutting portions C and are merely fillers for the slots 26 in all of the sections. It is obvious that, in the case of a plain roll, a filler strip comprising only the end portions E and a continuous depressed portion D extending between said portions might, in some instances, be employed. For convenience, however, all of the strips 27 are herein referred to as "knives" whether they actually perform any cutting function or not, since the filler strips, where employed, take the place of knives in the particular location which they occupy and are therefore the mechanical equivalents thereof or substitutes therefor in the assembly of the roll, and where the term "knives" is employed in the following claims it is to be taken as including all of the elements 27 of whatever shape they may be in accordance with the requirements of the portion of the particular roll upon which they are located.

The "waffle" engraving W and w in the roll sections II and IV is also to be taken as merely illustrative, since it is obvious that any portion or portions of the rolls may be so engraved as to impress any desired designs on one or both sides of the candy, the portions W' and w' of the knives being correspondingly formed.

Having thus described my invention, I claim:

1. A roll for candy making machines having about its periphery a plurality of fixed longitudinal knives of substantially equal length and a number of different forms.

2. A built-up roll for candy-making machines having a series of knives of substantially equal length and a number of different forms, said parts having provision for securing said knives in fixed positions about the periphery of said roll in different arrangements to provide for different kinds of cut.

3. A built up roll for candy making machines having a circumferential series of substantially straight longitudinal knives of substantially equal length and a number of different forms, said parts having provision for securing said knives in fixed positions about the periphery of said roll in different arrangements to provide for different kinds of cut.

4. A roll for candy-making machines formed with end flanges and a portion of less diameter between said flanges, said roll having separately formed fixed knixes extending between said flanges, and said knives having portions substantially flush with said flanges and portions substantially flush with the intermediate portion of said roll.

5. A built-up roll for candy-making machines formed with end flanges and a portion of less diameter between said flanges, said roll having longitudinal slots extending throughout the length thereof, and knives secured in fixed positions in said slots and having portions substantially flush with said flanges.

6. A roll for candy-making machines having a portion of its peripheral surface engraved to impress designs upon the candy, said roll having slots crossing said engraved portion, and knives in said slots having portions shaped to correspond to and complete said engraved portion where the latter is interrupted by said slots.

7. A roll for candy-making machines having a portion of its peripheral surface engraved to impress designs upon the candy, said roll having slots crossing said engraved portion, and knives fixed in said slots, said knives having portions shaped to correspond and complete said engraved portion where the latter is interrupted by said slots, and other portions projecting beyond said engraved portion to cut off the candy.

8. A roll for candy-making machines having a slot and a knife inserted in said slot, said knife having a portion substantially flush with the peripheral surface of said roll and a cutting portion projecting beyond the same.

9. A roll for candy-making machines having its periphery formed with a longitudinal slot, and a substantially straight knife fixed in said slot, said knife having a portion substantially flush with said periphery and a portion extending beyond the same.

10. A roll for candy-making machines having a portion of its peripheral surface engraved to impress designs upon candy and slots crossing said engraved portion, and knives located in said slots, said knives having portions corresponding to and completing said engraved portions, portions substantially flush with the remainder of the periphery of said roll, and portions extending beyond said last-named portions and beyond said engraved portions of said roll for cutting off the candy.

11. A built-up roll for candy-making machines, comprising a longitudinal series of circumferential sections and longitudinally disposed knives crossing all of said sections and shaped to provide for different lengths of the cut in the several sections.

12. A built-up roll for candy-making machines comprising a longitudinal series of circumferential sections, and a plurality of longitudinally disposed knives of different forms crossing said sections, said parts having provision for securing said knives about the periphery of said roll in different arrangements to provide for any length of cut, within the capacity of the machine, in any of the several sections.

13. A built-up roll for candy-making machines having its periphery formed with longitudinal slots of substantially equal length, and a plurality of knives of different forms adapted to be received in said slots in different arrangements to provide different kinds of cut at different points longitudinally of said roll, each of said knives being of a length substantially to fill any of said slots.

14. A roll for candy-making machines, having a circumferential portion of its periphery engraved to impress designs upon the candy and longitudinally disposed knives crossing said engraved portion, some of said knives having portions corresponding to and completing said engraved portion and having other portions shaped to provide for different lengths to cut off at different longitudinal portions of said roll.

15. A roll for candy-making machines having secured to its periphery a series of longitudinally extending knives, different knives of the series being differently formed at corresponding portions of their length to provide for different lengths to cut off at different longitudinal portions of said roll.

16. A roll for candy-making machines having secured to its periphery a series of knives having cutting portions and at least some of said knives having also blank portions, the cutting portions of some of said knives being staggered with respect to the cutting portions of adjacent knives.

17. A roll for candy-making machines comprising a longitudinal series of circumferential sections and longitudinal knives crossing all of said sections, the cutting edges of at least some of said knives being interrupted opposite one or more of said sections, and the interrupted portions of different knives being differently positioned longitudinal of said knives.

18. A roll for candy-making machines comprising a longitudinal series of circumferential sections and a circumferential series of longitudinal knives crossing all of said sections, successive knives of the series being differently formed to provide for different lengths of cut in the several sections.

In testimony whereof I affix my signature.

ROBERT S. HISLOP.